US008528707B2

(12) United States Patent
Kim

(10) Patent No.: US 8,528,707 B2
(45) Date of Patent: Sep. 10, 2013

(54) DISC BRAKE FOR VEHICLE

(75) Inventor: Myoung June Kim, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 657 days.

(21) Appl. No.: 12/631,726

(22) Filed: Dec. 4, 2009

(65) Prior Publication Data

US 2010/0140030 A1    Jun. 10, 2010

(30) Foreign Application Priority Data

Dec. 8, 2008   (KR) ...................... 10-2008-0124004

(51) Int. Cl.
*F16D 65/21*   (2006.01)

(52) U.S. Cl.
USPC ........ 188/156; 188/71.8; 188/71.9; 188/72.2; 188/73.31; 188/73.47; 188/106 F; 188/171; 188/196 V

(58) Field of Classification Search
USPC ................... 188/72.2, 79.51, 1.11 W, 1.11 L, 188/71.7, 71.8, 72.8, 156, 71.9, 73.3, 70 R, 188/70 B, 171, 72.3, 72.7, 73.42
IPC ................................. F16D 55/02, 55/14, 65/16
See application file for complete search history.

(56) References Cited

U.S. PATENT DOCUMENTS

| 3,199,634 A | * | 8/1965 | Chouings | 188/73.42 |
| 4,121,696 A | * | 10/1978 | Margetts | 188/71.3 |
| 4,226,307 A | * | 10/1980 | Dorot | 188/196 V |
| 4,457,408 A | * | 7/1984 | Montalvo, III | 188/72.2 |
| 4,460,070 A | * | 7/1984 | Meyer et al. | 188/73.1 |
| 4,553,643 A | * | 11/1985 | Wilcox | 188/71.9 |
| 2003/0136617 A1 | * | 7/2003 | Gherardi et al. | 188/73.38 |

FOREIGN PATENT DOCUMENTS

| EP | 141409 A1 | * | 5/1985 |
| JP | 10047395 A | * | 2/1998 |
| JP | 2007315541 A | * | 12/2007 |
| KR | 10-2004-0023800 A | | 3/2004 |

OTHER PUBLICATIONS

Chinese Office Action, and English translation thereof, issued in Chinese Patent Application No. 200911000141.9 dated Jul. 30, 2012.

* cited by examiner

*Primary Examiner* — Robert A Siconolfi
*Assistant Examiner* — San Aung
(74) *Attorney, Agent, or Firm* — McDermott Will & Emery LLP

(57) ABSTRACT

Disclosed is a disc brake for a vehicle, such as an electronic wedge brake, capable of preventing a disc from being subject to the moment due to misalignment of inner and outer friction members with respect to a disc. The disc brake includes a disc rotating together with a vehicle wheel, inner and outer friction pads disposed at both sides of the disc, respectively, a wedge unit installed at rear sides of the inner and outer friction pads to press the inner and outer friction pads against the disc, a driving device that operates the wedge unit for a braking operation, and a sync member for synchronizing braking positions of the inner and outer friction pads with respect to the disc. Since the disc is prevented from being subject to the moment, uneven wear does not occur in the friction member and/or the disc and deformation of the disc is prevented.

3 Claims, 4 Drawing Sheets

(a)

(b)

DISC BRAKE FOR VEHICLE

This application claims the benefit of Korean Patent Application No. 10-2008-0124004 filed on Dec. 8, 2008, in the Korean Intellectual Property Office, the disclosure of which is incorporated herein by reference.

BACKGROUND OF THE INVENTION

1. Field of the Invention

The present invention relates to a disc brake for a vehicle. More particularly, the present invention relates to a disc brake for a vehicle, which presses a friction pad against a disc through a wedge action.

2. Description of the Related Art

A disc brake is a device for obtaining braking force by pressing a friction pad against an outer surface of a disc rotating together with a wheel. The disc brake includes an electronic wedge brake (EWB) that presses a friction pad against a disc by using a sliding type wedge member. For instance, the wedge member presses the friction pad against the disc while being moved along an oblique side thereof by a driving device.

The EWB includes a driving motor for driving the wedge member, a screw shaft coupled with a rotating shaft of the driving motor, and a pressing member coupled to the screw shaft such that the pressing member can move back and forth according to the operation of the driving motor to press the wedge member against the disc.

According to the EWB, as the driving motor operates, the pressing member presses the wedge member against the disc, so that the friction pad makes contact with the disc. At the same time, the wedge member further presses the friction pad against the disc while being moved along an oblique side thereof, so that the braking action is achieved.

However, according to the disc brake for the vehicle of the related art, a first friction member, which is provided at one side of the disc brake where the driving motor is installed, makes contact with the disc according to the operation of the wedge member while moving toward the disc along the oblique side of the wedge member. In contrast, a second friction member, which is provided at the other side of the disc brake, linearly moves perpendicularly to the disc, so that the first and second friction members may not be aligned in the same position at the braking time. As a result, the moment is applied to the disc, so that uneven wear may occur in the friction members or the disc. In extreme case, the disc may be deformed.

SUMMARY OF THE INVENTION

Accordingly, it is an aspect of the present invention to provide a disc brake for a vehicle, capable of preventing a disc from being subject to the moment by aligning inner and outer friction members in the same position with respect to the disc.

Additional aspects and/or advantages of the invention will be set forth in part in the description which follows and, in part, will be apparent from the description, or may be learned by practice of the invention.

The foregoing and/or other aspects of the present invention are achieved by providing a disc brake for a vehicle, the disc brake including a disc rotating together with a vehicle wheel, inner and outer friction pads disposed at both sides of the disc, respectively, a wedge unit installed at rear sides of the inner and outer friction pads to press the inner and outer friction pads against the disc, a driving device that operates the wedge unit for a braking operation, and a sync member for synchronizing braking positions of the inner and outer friction pads with respect to the disc.

According to the present invention, the wedge unit includes sliding wedge parts installed at the rear sides of the inner and outer friction pads and formed at rear sides thereof with oblique surfaces, respectively, and inner and outer wedge parts formed with oblique surfaces corresponding to the oblique surfaces of the sliding wedge parts and supported by a caliper housing of the vehicle.

According to the present invention, the sync member includes first and second rods, which are provided at the sliding wedge parts installed at the rear sides of the inner and outer friction pads, and the first and second rods are assembled with each other in such a manner that a length of the sync member is adjustable.

According to the present invention, the sync member has an anti-rotation structure.

According to the disc brake for the vehicle of the present invention, the sliding wedge members are installed corresponding to the inner and outer friction pads provided at both sides of the disc, and the movement of the sliding wedge parts is synchronized by the sync bar, so that the inner and outer friction pads can be aligned in the same position with respect to the disc, thereby preventing the disc position with respect to the disc, thereby preventing the disc from being subject to the moment.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
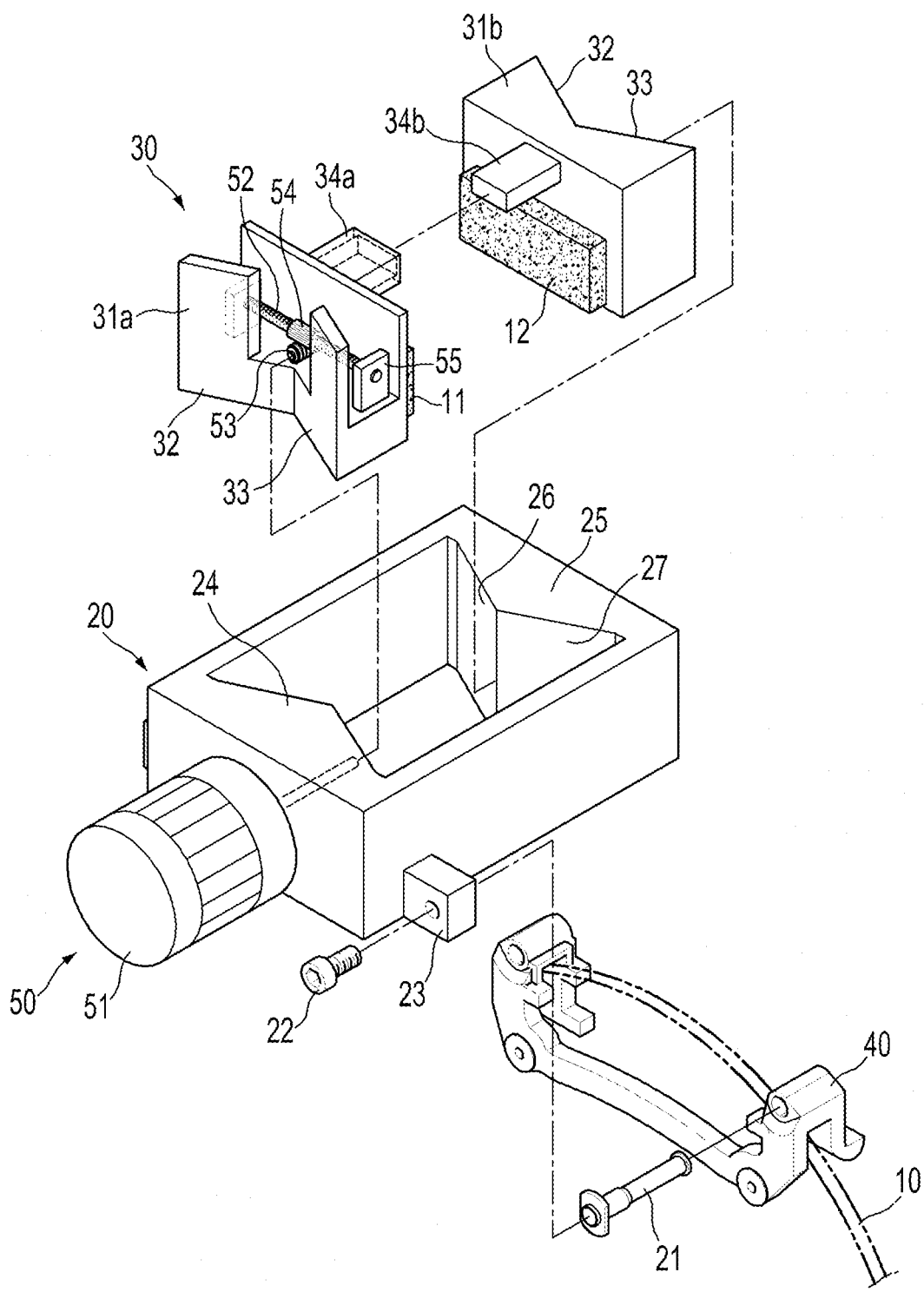
FIG. 1 is an exploded perspective view schematically showing a disc brake for a vehicle according to one embodiment of the present invention.

Reference will now be made in detail to the embodiments of the present invention, examples of which are illustrated in the accompanying drawings, wherein like reference numerals refer to the like elements. The embodiments are described below to explain the present invention by referring to the figures.

Figure 2:
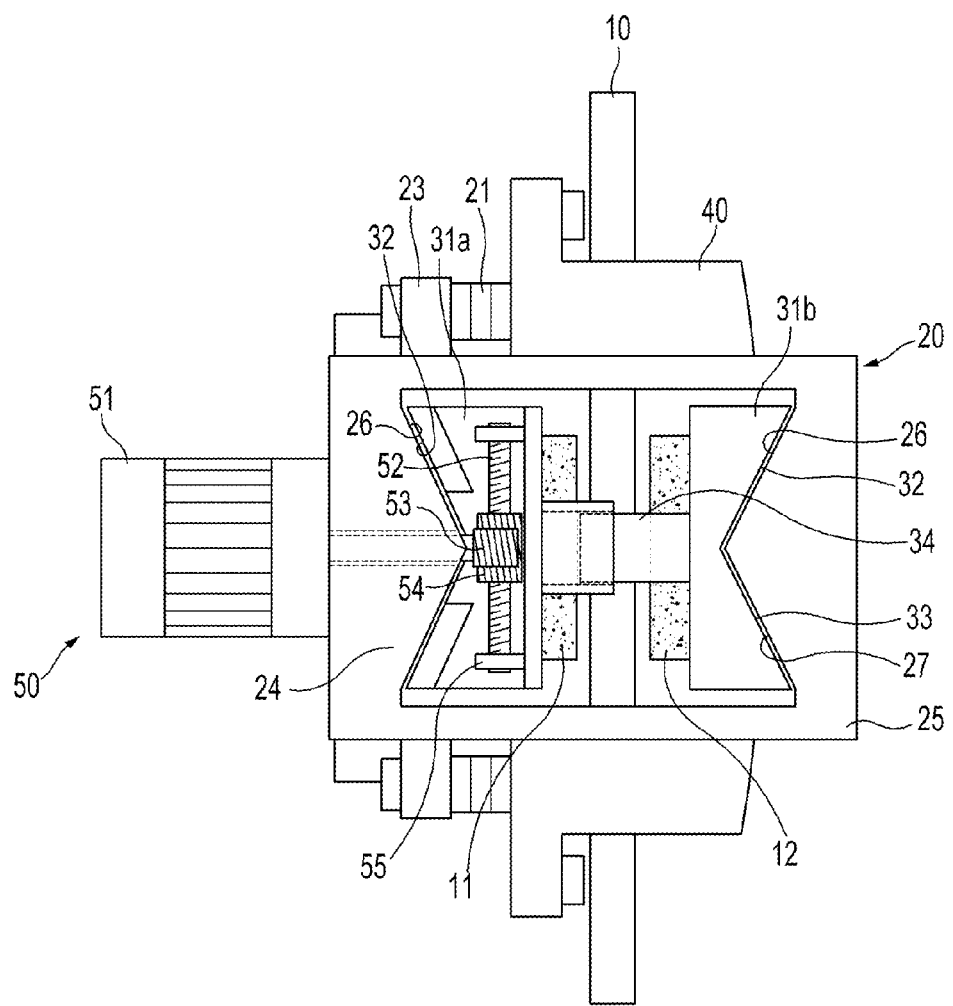
FIG. 2 is a plan view of a disc brake for a vehicle according to one embodiment of the present invention.

FIG. 1 is an exploded perspective view of a disc brake for a vehicle according to the present invention, and FIG. 2 is an assembled view of FIG. 1.

As shown in FIGS. 1 and 2, the disc brake for the vehicle according to the present invention includes a disc 10 rotating together with a vehicle wheel (not shown), and inner and outer friction pads 11 and 12 installed at both sides of the disc 10 for the purpose of friction braking of the disc 10. In addition, the disc brake for the vehicle further includes a caliper housing 20 and a wedge unit 30 for pressing the inner and outer friction pads 11 and 12 against the disc 10, and a driving device 50 that operates the wedge unit 30 to press the inner and outer friction pads 11 and 12.

The inner and outer friction pads 11 and 12 are supported by a carrier 40 fixed to a knuckle part (not shown) of the vehicle in such a manner that the inner and outer friction pads 11 and 12 can move back and forth to press both sides of the disc 10. The caliper housing 20 is coupled to both sides of the carrier 40 through a guide rod 21 coupled to both sides of the caliper housing 20 in such a manner that the caliper housing 20 can move back and forth. The guide rod 21 is coupled to both sides of a rod coupling part 23 of the caliper housing 20 by a fixing screw 22 in a state in which an elastic member (not shown) is interposed between the guide rod 21 and the fixing screw 22. The caliper housing 20 moves back and forth to press an outer surface of the outer friction pad 12.

The wedge unit 30 includes sliding wedge parts 31 provided at rear sides of the inner and outer friction pads 11 and 12, respectively, an inner wedge part 24 provided at one inner sidewall of the caliper housing 20 while facing one of the sliding wedge parts 31, and an outer wedge part 25 provided at the other inner sidewall of the caliper housing 20 while facing the other of the sliding wedge parts 31. That is, the sliding wedge parts 31 are positioned between the inner friction pad wedge parts 31 are positioned between the inner friction pad 11 and the inner wedge part 24 and between the outer friction pad 12 and the outer wedge part 25, respectively.

The sliding wedge parts 31 are formed on rear surfaces thereof with oblique surfaces 32 and 33 which are symmetrically arranged in the form of a V shape. In addition, the inner and outer wedge parts 24 and 25 are formed on front surfaces thereof with oblique surfaces 26 and 27, which are symmetrically arranged in the form of an inverse-V shape corresponding to the oblique surfaces 32 and 33 of the sliding wedge parts 31. In the following description, the sliding wedge part 31 arranged between the inner wedge part 24 and the inner friction pad 11 will be referred to as a first sliding wedge part 31a and the sliding edge part 31 arranged between the outer wedge part 25 and the outer friction pad 12 will be referred to as a second sliding wedge part 31b.

Figure 3:
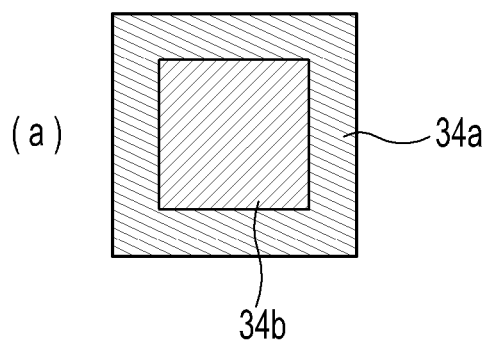
FIG. 3 is a sectional view showing sync bars of a disc brake for a vehicle according to one embodiment of the present invention.
Figure 3:
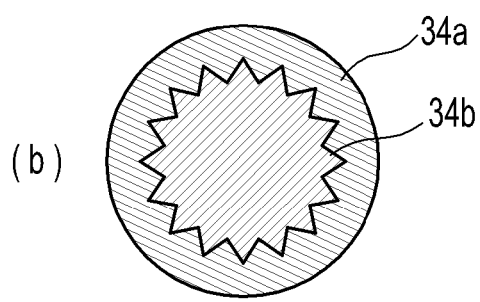

The first sliding wedge part 31a is coupled with the second sliding wedge part 31b by a sync bar 34 such that the first and second sliding wedge parts 31a and 31b can move simultaneously. The sync bar 34 transversely extends while crossing over the disc 10 and includes a first rod 34a provided in the first sliding wedge part 31a and a second rod 34b provided in the second sliding wedge part 31b. The first and second rods 34a and 34b are assembled with each other such that the length of the sync bar 34 can be variously adjusted. In addition, as shown in FIG. 3, the first and second rods 34a and 34b must have angular sectional shapes or concave-convex sectional shapes such that the first and second rods 34a and 34b can be arranged in the same position with respect to the disc 10 without rotating relative to each other.

The driving device 50, which operates the first and second sliding wedge parts 31a and 31b for the purpose of braking operation, is installed at one side of the 31a and 31b for the purpose of braking operation, is installed at one side of the inner wedge part 24 of the caliper housing 20. For instance, the driving device 50 may include a driving motor 51 positioned at an outer surface of the inner wedge part 24 and having a rotating shaft extending by passing through the inner wedge part 24 in parallel to the pressing direction for the inner friction pad 11, a screw shaft 52 arranged in parallel to the disc 10 and in perpendicular to the rotating shaft of the driving motor 51, a worm 54 provided at the rotating shaft of the driving motor 51, a worm gear including a worm wheel 54 mounted on the center of the screw shaft 52 to engage with the worm 53, and bolt walls 55 screw-coupled with the screw shaft 52 and moved according to rotation of the screw shaft 52 in order to move the first sliding wedge part 31a toward the disc 10.

In addition, the screw shaft 52 is rotatably installed in the first sliding wedge part 31a and the bolt walls 55 are fixed to the first sliding wedge part 31a while being screw-coupled with the screw shaft 52. Thus, if the driving motor 51 is driven for the purpose of the braking operation, the first sliding wedge part 31a moves closely to the disc 10 along the oblique surfaces 26 and 27 of the inner wedge part 24, thereby pressing the inner friction pad 11.

Since the second sliding wedge part 31b also moves together with the first sliding wedge part 31a due to the sync bar 34, if pressing force for the second friction pad 12 is applied through the caliper housing 20, the second sliding wedge part 31b presses the outer friction pad 12 against the disc 10 at the position the same as that of the first sliding wedge part 31a.

Hereinafter, the operation of the disc brake for the vehicle according to the present invention will be described.

Figure 4:
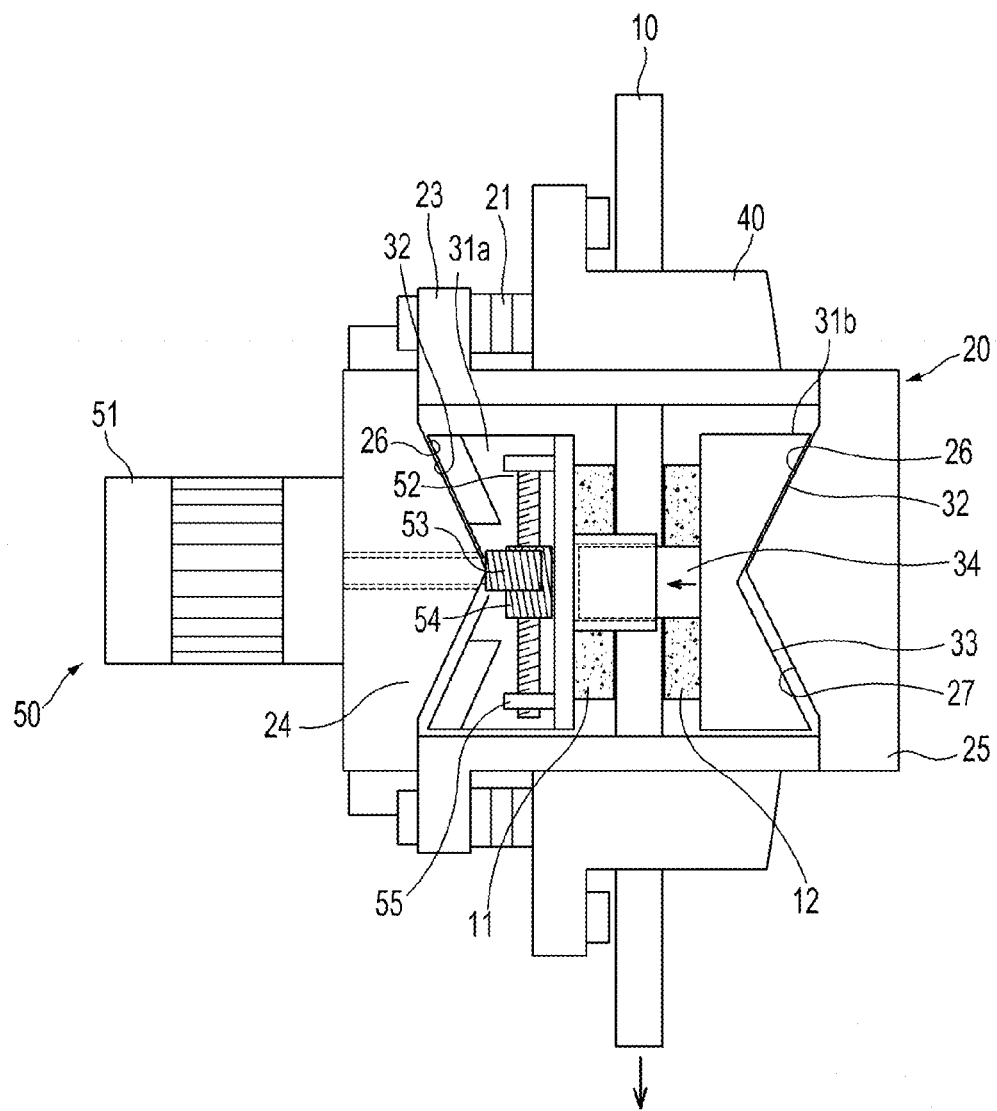
FIG. 4 is a view for explaining an operation of a disc brake for a vehicle according to one embodiment of the present invention.

FIG. 2 shows the disc brake when the braking operation is not performed. In this state, if the braking operation starts, as shown in FIG. 4, the driving motor 51 is driven so that the first sliding wedge part 31a approaches the disc 10 due to the rotation of the worm 53. As the worm 53 rotates, the worm wheel 54 is also rotated at a low speed according to the reduction gear ratio between the worm 53 and the worm wheel 54, so that the worm wheel 54 can rotate the screw shaft 52 with higher torque. Upon the rotation of the screw shaft 52, the bolt walls 55 of the first sliding wedge part 31 a moves lengthwise along the screw shaft 52 so that the first sliding wedge part 31a is moved toward the disc 10. That is, the oblique surface 32 formed on the rear side of the first sliding wedge part 31a is moved along the oblique surface 26 of the inner wedge part 24, so that the first sliding wedge part 31a presses the inner friction pad 11 against the disc 10, thereby achieving the braking action. As the inner friction pad 11 makes contact with the disc 10, the inner friction pad 11 is urged to rotate in the rotational direction of the disc 10, so the first sliding wedge part 31a tends to move in the rotational direction of the disc 10. Thus, the self-reinforcement effect is generated so that the greater braking force can be obtained.

As the inner friction pad 11 presses the disc 10, the caliper housing 20 is subject to repulsive force, so the caliper housing 20 moves reversely to the pressing direction of the inner friction pad 11, thereby pressing the outer friction pad 12 against the disc 10. Thus, the same friction occurs at both sides of the disc 10.

In detail, when the first sliding wedge part 31a moves along the oblique surface of the inner wedge part 24, the second sliding wedge part 31b moves to the the inner wedge part 24, the second sliding wedge part 31b moves to the position identical to the position of the first sliding wedge part 31a with respect to the disc 10 by means of the sync bar 34 before the caliper housing 20 is moved. Then, the caliper housing 20 moves inversely to the pressing direction for the inner friction pad 11, so that the outer wedge part 25 approaches the second sliding wedge part 31b. In this state, the outer friction pad 12 is pressed against the disc 10, thereby stopping the rotation of the disc 10.

When the braking operation is released, the driving motor 51 is inversely driven, so that the screw shaft 52 is inversely rotated. Thus, the first and second sliding wedges 31a and 31b may move back, so that the wedge unit 30 is released from the inner and outer friction pads 11 and 12.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc brake for a vehicle, the disc brake comprising:
    a disc rotating together with a vehicle wheel;
    inner and outer friction pads disposed at both sides of the disc, respectively;
    a wedge unit installed at rear sides of the inner and outer friction pads to press the inner and outer friction pads against the disc;
    a driving device that operates the wedge unit for a braking operation; and
    a sync member for synchronizing braking positions of the inner and outer friction pads with respect to the disc, wherein the sync member and wedge unit are coupled to each other so that the sync member and wedge unit are collectively movable in a direction transverse to a rotational axis of said disc,
    the wedge unit includes sliding wedge parts installed at the rear sides of the inner and outer friction pads and formed at rear sides thereof with oblique surfaces, respectively; and
    inner and outer wedge parts formed with oblique surfaces corresponding to the oblique surfaces of the sliding wedge parts and supported by a caliper housing of the vehicle.

2. The disc brake as claimed in claim 1, wherein the sync member includes first and second rods, which are provided at the sliding wedge parts installed at the rear sides of the inner and outer friction pads, and the first and second rods are assembled with each other in such a manner that a length of the sync member is adjustable.

3. The disc brake as claimed in claim 2, wherein the sync member has an anti-rotation structure.

* * * * *